United States Patent [19]
Williamson

[11] 4,123,505
[45] Oct. 31, 1978

[54] REDUCING $SO_2$ IN REFINERY OFF GAS

[75] Inventor: Albert E. Williamson, Belllingham, Wash.

[73] Assignee: Mobil Oil Corporation, New York, N.Y.

[21] Appl. No.: 874,454

[22] Filed: Feb. 2, 1978

Related U.S. Application Data

[63] Continuation-in-part of Ser. No. 688,805, May 21, 1976, abandoned.

[51] Int. Cl.$^2$ .................. C01B 17/16; C01B 17/02
[52] U.S. Cl. .................... 423/564; 423/228; 423/573 G
[58] Field of Search ............. 423/228, 229, 573 R, 423/573 G, 574 R, 574 G, 564

[56] References Cited

U.S. PATENT DOCUMENTS

| | | | |
|---|---|---|---|
| 3,752,877 | 8/1973 | Beauon | 423/573 |
| 3,848,071 | 11/1974 | Groenendaal | 423/574 |
| 3,947,547 | 3/1976 | Groenendaal et al. | 423/573 G |
| 3,985,861 | 10/1976 | Hudson, Jr. | 423/573 R |

FOREIGN PATENT DOCUMENTS 258,750  6/1963  Australia .................. 423/228

OTHER PUBLICATIONS

Naberje et al., Newshell Process Treats Claus Off Gas Chemical Engineering Progress, vol. 69, #12, Dec. 1973, pp. 29–34.

Primary Examiner—O. R. Vertiz
Assistant Examiner—Gary P. Straub
Attorney, Agent, or Firm—Charles A. Huggett; Michael G. Gilman; Alverna M. Paulan

[57] ABSTRACT

Conventionally $H_2S$ laden gases are amine scrubbed, the $H_2S$ sprung from the amine, converted to sulfur in the Claus process and the tail gas from the Claus process scrubbed in a tail gas facility such as Beavon-Stretford, Shell SCOT or IFP. The instant disclosure eliminates the aforementioned scrubbing processes by reducing $SO_2$ in Claus tail gas with a hydrogen rich gas to $H_2S$ and condensing water out of this reduced product. The dehydrated product having a lower sulfur level is compressed and admixed with other refinery gases in a refinery fuel gas mixing vessel and used as fuel in the refinery.

7 Claims, 2 Drawing Figures

REDUCING SO₂ IN REFINERY OFF GAS

CROSS REFERENCE TO RELATED APPLICATION

This is a continuation-in-part of application Ser. No. 688,805, filed May 21, 1976, now abandoned.

This invention relates to reduction in sulfur content of refinery off gases.

It is well known that petroleum contains more or less sulfur in its produced form and that this sulfur (more or less of it) may be converted to hydrogen sulfide ($H_2S$) in various unit processes traditionally carried out in a petroleum refinery. As the society becomes more ecologically conscious, increased demands are made for reducing the sulfur level in various petroleum products emerging from the refinery. This sulfur does not "go away", but rather is converted from sulfur in the petroleum products to sulfur in the form of hydrogen sulfide in various refinery gases.

Refinery off gases are often used for fuel gas in the refinery in order to conserve energy and to increase efficiency, and it is desirable to minimize their $H_2S$ content in order to minimize the sulfur dioxide ($SO_2$) which would be formed upon burning this fuel gas. The $H_2S$ containing refinery gases are conventionally subjected to amine absorption, whereby the $H_2S$ is taken out of the refinery gases by dissolution in a lean amine solution. It is also conventional to regenerate the rich amine solution formed by such dissolution by springing the $H_2S$ by the addition of heat from its dissolved state whereupon the regenerated lean amine solution is recycled for further gas scrubbing.

Recent government regulations require the further reduction of sulfur emissions and also require the recovery of elemental sulfur as a product of refinery operations rather than the venting of volatile sulfur compounds. It has thus become usual for refineries to install conventional Claus processes for converting the $H_2S$ sprung during the amine regeneration to elemental sulfur. This process oxidizes a part of the $H_2S$ to $SO_2$ and reacts this $SO_2$ with the remaining $H_2S$ to form water and sulfur. This sulfur is recovered for sale. The tail gas from the Claus process, while small in volume, has a relatively high concentration of $SO_2$ which cannot be vented and still meet current environmental protection agency limits. Therefore, consideration has been given to installing other, additional processes such as Beavon-Stretford, Shell SCOT or IFP for removing residual $SO_2$ from Claus plant tail gas.

As will be appreciated, as more and more sulfur is removed, the remaining sulfur becomes increasingly difficult and expensive to remove from tail gases. The conventional tail gas clean-up processes are fairly expensive and the value of the recovered sulfur does not pay the cost of the process.

It is therefore an object of this invention to provide alternate novel means of reducing the sulfur content of Claus process tail gas while meeting environmental regulations.

Other and additional objects of this invention will become apparent from a consideration of this entire specification including the drawings and the claims hereof.

Understanding of this invention will be facilitated by reference to the accompanying drawing in which.

In accord with and fulfilling these objects, one aspect of this invention resides in a process comprising admixing a sulfur dioxide containing stream with a hydrogen containing stream in contact with a catalyst comprising a Group VI and/or Group VIII metal moiety under conditions of temperature, pressure and space velocity sufficient to convert the sulfur dioxide to hydrogen sulfide and water; cooling the product to condense out water; and then admixing the dehydrated gas containing hydrogen sulfide into the conventional refinery fuel gas system. In this process, the tail gas from the Claus portion of the process contains some, albeit a very small, amount of sulfur dioxide. According to a preferred aspect of this invention, it is this tail gas containing sulfur dioxide which is the preferred feed referred to above.

Figure 1:
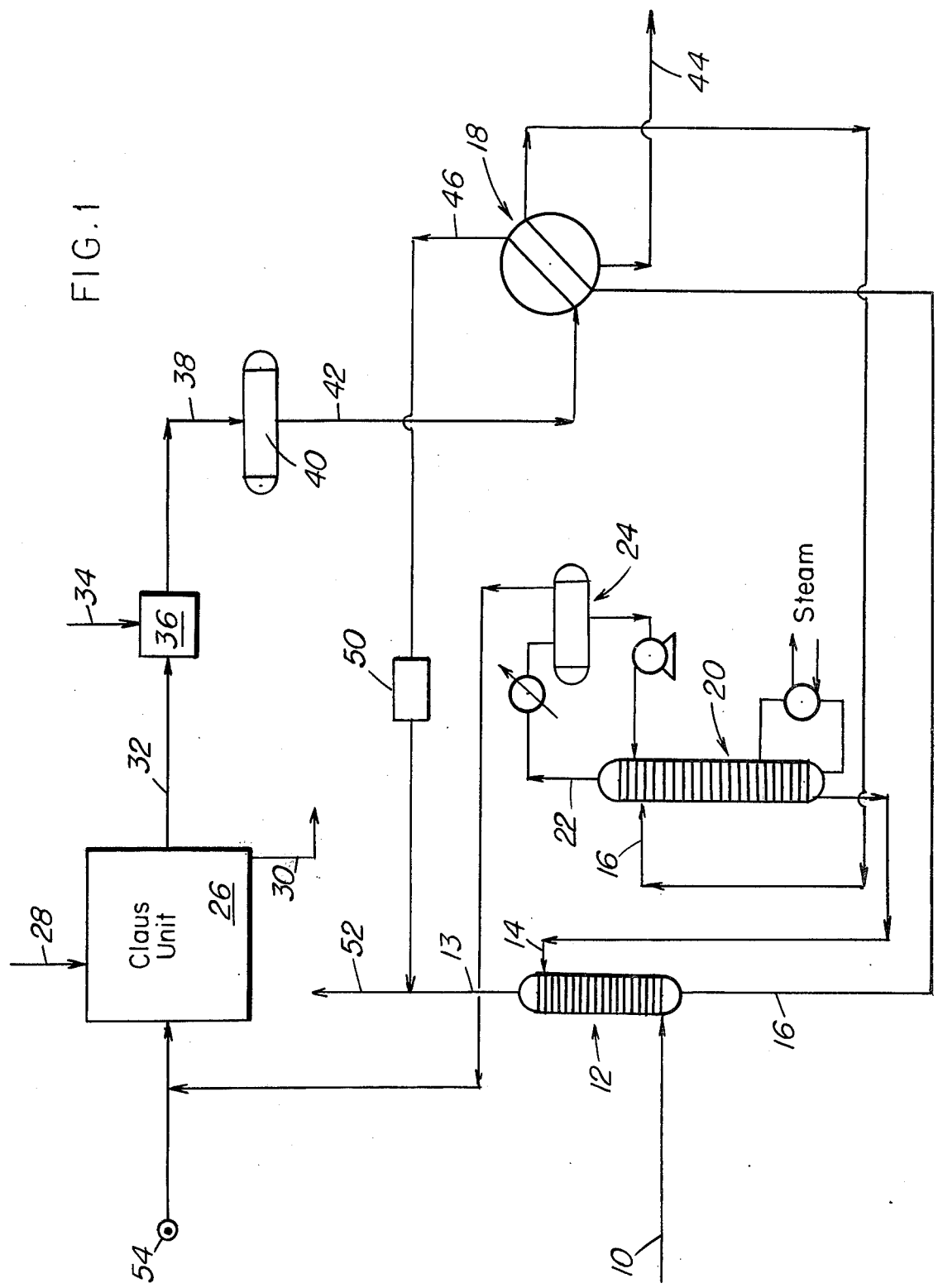
FIG. 1 is a schematic flow diagram of one embodiment of this invention.

Referring now to the drawing and particularly to FIG. 1 thereof, a refinery fuel gas stream containing hydrogen sulfide 10 is fed to an amine scrubber 12 through which an aqueous amine solution 14 passes downwardly, absorbing sulfur moiety and exiting as a stream 16 laden with stripped sulfur moiety, usually dissolved hydrogen sulfide. The gas, now stripped of sulfur values, leaves the amine scrubber as a fuel gas 13. The sulfur laden stream 16, possibly after heat exchanger 18, is fed to an amine regenerator 20 from which regenerated aqueous amine solution 14 exists at the bottom and a gas comprising hydrogen sulfide 22 exits at the top. This exit gas 22, possibly after partial condensation and reflux 24, goes to a three-stage Claus unit 26 in which it is mixed with oxygen 28, as such or as air, and reacted to form elemental sulfur which is recovered 30 and an off gas 32 containing substantially less sulfur than was in the original feed 10.

According to this invention, this off gas 32 is then mixed with a suitable amount of reducing agent 34 in a mixer 36. The reducing agent may be hydrogen, fuel gas or the like. The mixed off gas and reducing agent 38 is then reacted over a suitable catalyst, such as cobalt and/or molybdenum oxides on alumina, in a reactor 40 to produce a product 42 comprising hydrogen sulfide and water. This product 42 is cooled in the heat exchange 18 to condense out water 44 and the gas 46 comprising hydrogen sulfide is compressed by compressor 50 and admixed with the scrubbed gas stream 13 forming stream 52 which is returned to the refinery fuel gas mixing vessel.

It is within the scope of this invention to accumulate selected hydrogen sulfide containing streams from around the refinery to feed to the Claus unit. This is exemplified by the overhead from the sour water stripper and is represented at 54.

Figure 2:
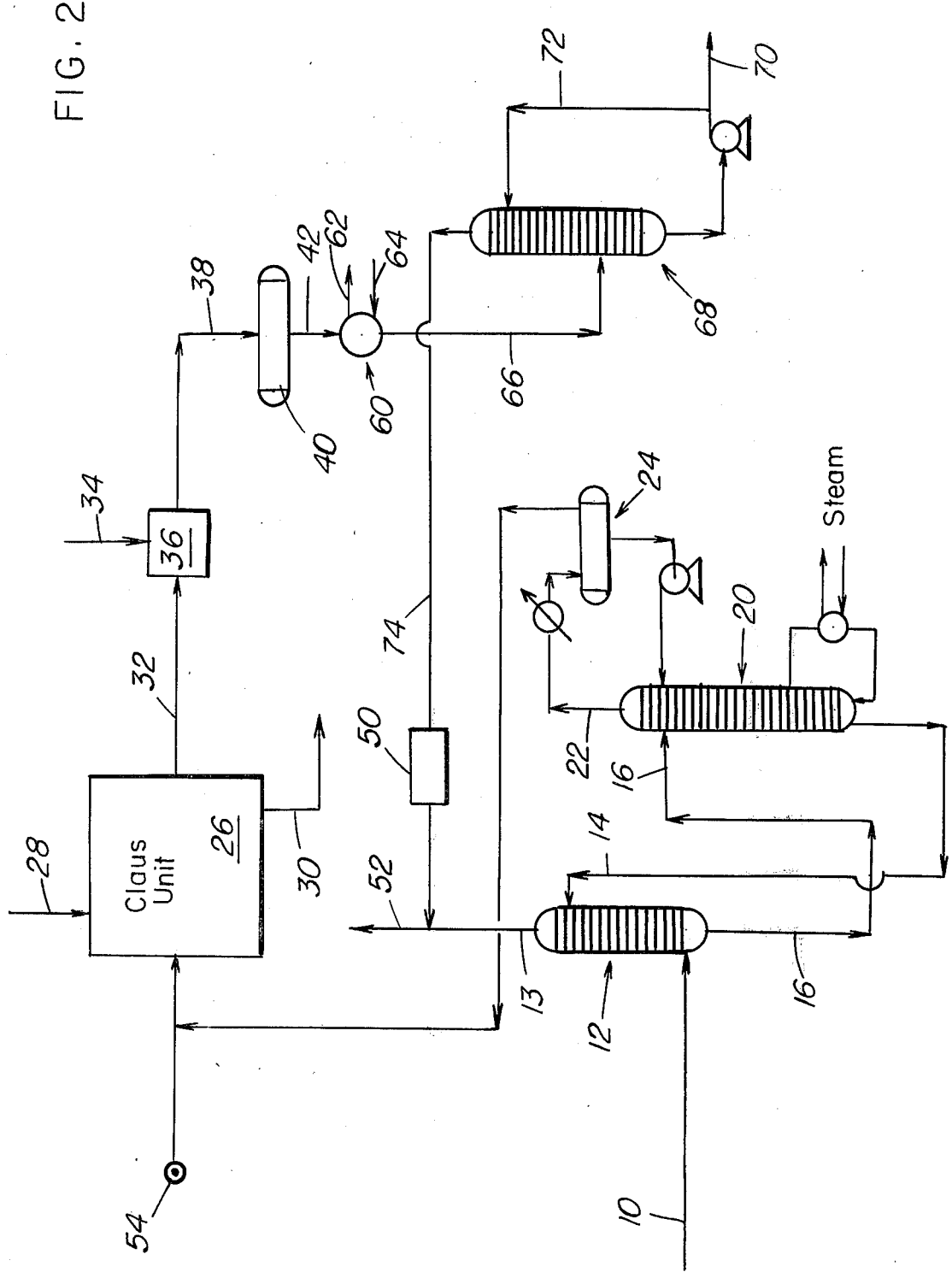
FIG. 2 is similar to FIG. 1 showing an alternate embodiment.

A modification of this process is shown in FIG. 2 wherein all functions and streams which are similar to those in FIG. 1 are given like reference numerals. In this modification, the hot hydrogen sulfide containing reaction product 42 is cooled in a heat exchanger 60 to produce low pressure steam 62 from feed water 64 and the cooled product 66 further cooled in a column 68 to condense out water 70 and recycle liquid 72. The overhead 74, which is a cool hydrogen sulfide containing gas, is compressed in compressor 50 and admixed with the scrubbed gas stream 13 forming gas stream 52 which is returned to the refinery fuel gas mixing vessel.

In both embodiments, it is preferred to feed the condensed water, 44 and 70 respectively, to a conventional sour water stripper (not shown) and to reintroduce the overhead from the sour water stripper into the Claus unit, as for example as shown at 54.

It is well known to use di-methanol, d-ethanol or di-isopropanol amine in the amine scrubber but this invention is not limited to the use of these specific reagents.

EXAMPLE

A refinery fuel gas stream having the following composition:

| Constituent | Mols/Hr. |
|---|---|
| $H_2$ | 70.8 |
| $C_1$ | 162.5 |
| $C_2-$ | 70.5 |
| $C_2$ | 79.0 |
| $H_2S$ | 28.0 |
| $C_3-$ | 1.9 |
| $C_3$ | 1.2 |
| $C_6$ + heavy | 0.4 |
| | 414.3 | was charged to an amine scrubber where it was counter-currently contacted with diethanolamine. The gaseous effluent from the amine scrubber had the following composition:

| Constituent | Mols/Hr. |
|---|---|
| $H_2$ | 70.8 |
| $C_1$ | 162.5 |
| $C_2-$ | 70.5 |
| $C_2$ | 79.0 |
| $C_3-$ | 1.9 |
| $C_3$ | 1.2 |
| $C_6$ + heavy | 0.4 |
| | 386.3 |

The diethanolamine containing dissolved hydrogen sulfide was passed to an amine regenerator. A gas having the following composition:

| Constituent | Mols/Hr. |
|---|---|
| $C_2$ | 1.0 |
| $H_2S$ | 28.0 |
| $H_2O$ | 1.0 |
| | 30.0 | was separated from the amine and passed to a three-stage Claus unit together with gaseous effluent from a sour water stripper having the following composition:

| Constituent | Mols/Hr. |
|---|---|
| $H_2O$ | 5.0 |
| $H_2S$ | 7.0 |
| $NH_3$ | 9.0 |
| $CH_3SH$ | 22.2 |
| $C_2$ | 0.20 |
| | 23.40 |

The tail gas from the Claus unit where air is used as the source of oxygen having the following composition:

| Constituent | Mols/Hr. |
|---|---|
| $H_2$ | 1.68 |
| $H_2O$ | 59.82 |
| $CO$ | 1.82 |
| $N_2$ | 112.51 |
| $H_2S$ | 1.40 |
| $SO_2$ | 0.78 |
| $COS$ | 0.39 |

-continued

| Constituent | Mols/Hr. |
|---|---|
| $CS_2$ | 0.2 |
| $C_1$ | 0.04 |
| $S$ | 0.16 |
| | 178.80 | was mixed with a reducing gas having the following composition:

| Constituent | Mols/Hr. |
|---|---|
| $H_2$ | 5.0 |
| $C_1$ | 0.7 |
| $C_2$ | 0.3 |
| $C_3$ | 0.3 |
| | 6.3 | and passed to a reactor containing a cobalt/molybdenum catalyst. Effluent from the reactor having the following composition:

| Constituent | Mols/Hr. |
|---|---|
| $H_2$ | 4.0 |
| $C_1$ | 0.7 |
| $C_2$ | 0.3 |
| $H_2S$ | 1.8 |
| $C_3$ | 0.3 |
| $H_2O$ | 67.2 |
| $N_2$ | 114.7 |
| $CO_2$ | 3.4 |
| | 192.4 | was cooled to condense out water. Following condensation, the gas having the following composition:

| Constituent | Mols/Hr. |
|---|---|
| $H_2$ | 4.0 |
| $C_1$ | 0.7 |
| $C_2$ | 0.3 |
| $H_2S$ | 1.8 |
| $C_3$ | 0.3 |
| $H_2O$ | 10.8 |
| $N_2$ | 114.7 |
| $CO_2$ | 3.4 |
| | 136.0 | was admixed with the gaseous effluent from the amine scrubber to form a fuel gas which when burned meets environmental regulations for emission of sulfur dioxide.

What is claimed is:

1. In the process of reducing sulfur moieties from a fuel gas stream containing hydrogen sulfide by scrubbing the fuel gas with an amine solution whereby transferring hydrogen sulfide from said fuel gas to said solution and forming a fuel gas leaner in hydrogen sulfide and an amine solution richer in hydrogen sulfide; springing an intermediate gas comprising hydrogen sulfide from said rich amine solution and simultaneously regenerating said amine scrubbing solution; recirculating said regenerated amine solution to said scrubbing; and converting hydrogen sulfide in said intermediate gas with oxygen, to elemental sulfur and a tail gas comprising sulfur dioxide; the improvement which comprises converting sulfur dioxide in said tail gas to hydrogen sulfide by reducing such with a reducing agent comprising hydrogen; condensing water from said reduction product; and admixing said tail gas derived hydrogen sulfide with said fuel gas leaner in hydrogen sulfide.

2. The process claimed in claim 1 including condensing said water by indirect heat exchange of said reduction product with said hydrogen sulfide rich amine solution.

3. The process claimed in claim 1 including condensing said water by indirect steam production.

4. The process claimed in claim 1 wherein said amine is dimethanol amine, diethanol amine or di-isopropanol amine.

5. The process claimed in claim 1 wherein said sulfur dioxide is reduced over a catalyst comprising at least one of a Group VIII and Group VI metal.

6. The process claimed in claim 5 wherein said catalyst comprises cobalt and molybdenum on alumina.

7. In a process for operation of a refinery for conversion of petroleum to hydrocarbon products including the steps of separating hydrogen sulfide from sour water in a sour water stripper to produce an overhead stream containing hydrogen sulfide, removing hydrogen sulfide from gaseous material by absorption in an amine solution in an absorber to produce an amine solution containing absorbed hydrogen sulfide and an effluent gas depleted in hydrogen sulfide, supplying to said absorber the overhead stream from said sour water stripper together with gaseous streams containing fuel gas and hydrogen sulfide from refinery process units, conveying said fuel gas from said absorber to a fuel gas system of said refinery, heating said amine solution containing absorbed hydrogen sulfide by indirect heat exchange with a hot fluid, removing hydrogen sulfide from the so heated amine solution, returning stripped amine solution to said absorber, and converting hydrogen sulfide with air to elemental sulfur and a tail gas containing sulfur dioxide; the improvement which comprises catalytically converting a mixture of said tail gas with a reducing gas of hydrogen or fuel gas to yield hydrogen sulfide and water, cooling the effluent of such catalytic conversion by indirect heat exchange as the hot fluid exchanged with said amine solution containing hydrogen sulfide to obtain a condensate of water containing dissolved hydrogen sulfide, separating said condensate from gaseous components of said effluent, transferring said condensate to said sour water stripper and admixing said gaseous components with said fuel gas from said absorber.

* * * * *